(No Model.)  C. H. WEBER.  2 Sheets—Sheet 1.
COMPUTING MACHINE.

No. 599,989.  Patented Mar. 1, 1898.

WITNESSES:
H. B. Bradshaw
A. L. Phelps

INVENTOR
Charles H. Weber
BY
C. C. Shepherd
ATTORNEY (No Model.) 2 Sheets—Sheet 2.
C. H. WEBER.
COMPUTING MACHINE.
No. 599,989. Patented Mar. 1, 1898.
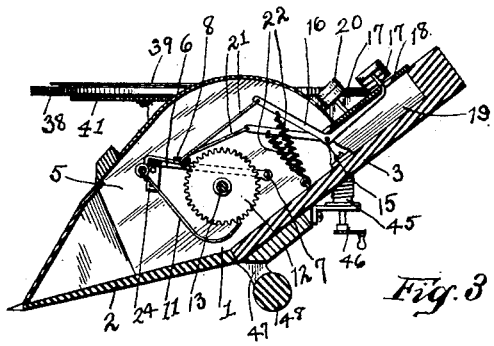
Fig. 3
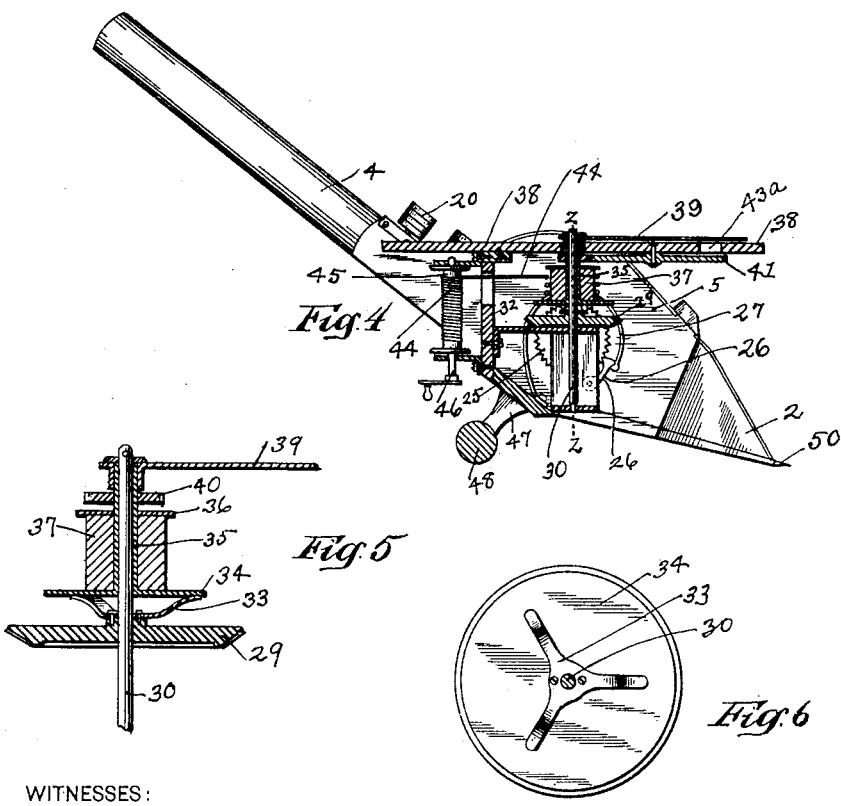
Fig. 4
Fig. 5
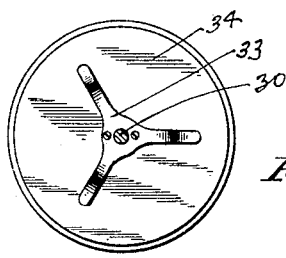
Fig. 6
WITNESSES:
H. B. Bradshaw
A. L. Phelps
INVENTOR
Charles H. Weber
BY
C. C. Shepherd
ATTORNEY

UNITED STATES PATENT OFFICE.

CHARLES H. WEBER, OF ALTON, OHIO.

COMPUTING-MACHINE.

SPECIFICATION forming part of Letters Patent No. 599,989, dated March 1, 1898.

Application filed August 23, 1897. Serial No. 649,149. (No model.)

*To all whom it may concern:*

Be it known that I, CHARLES H. WEBER, a citizen of the United States, residing at Alton, in the county of Franklin and State of Ohio, have invented a certain new and useful Improvement in Computing-Machines, of which the following is a specification.

My invention relates to the improvement of computing-machines; and the objects of my invention are to provide a simple, reliable, and effective device adapted for the rapid and accurate adding of figures; to so construct and arrange the parts of my device as to produce a positive operation thereof, and to produce other improvements in details of construction and arrangement of parts which will be more fully pointed out hereinafter. These objects I accomplish in the manner illustrated in the accompanying drawings, in which—

Figure 1:
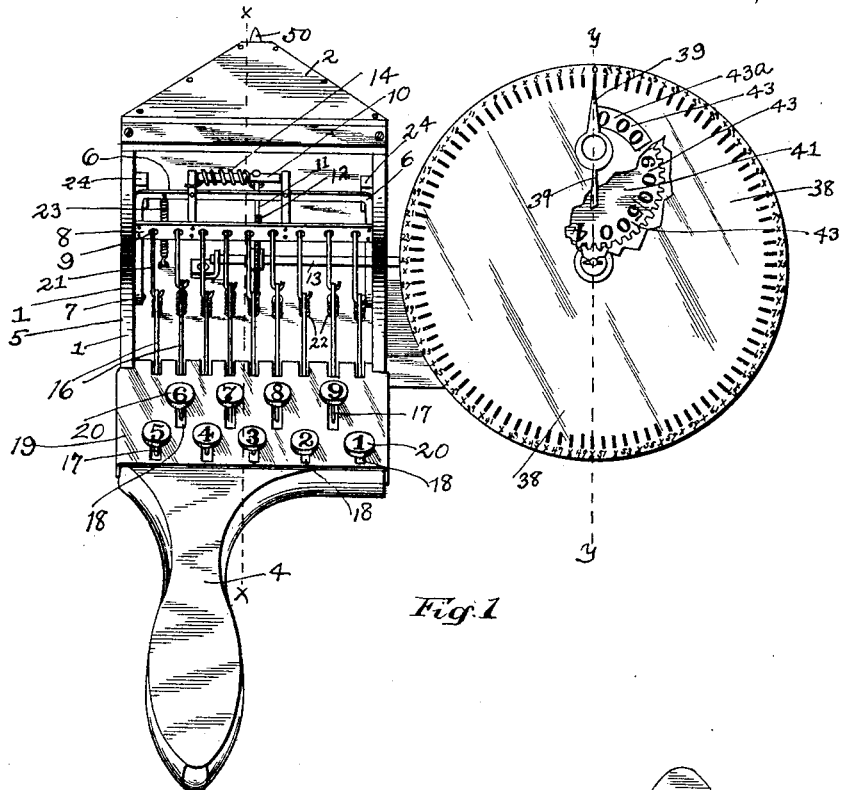
Figure 2:
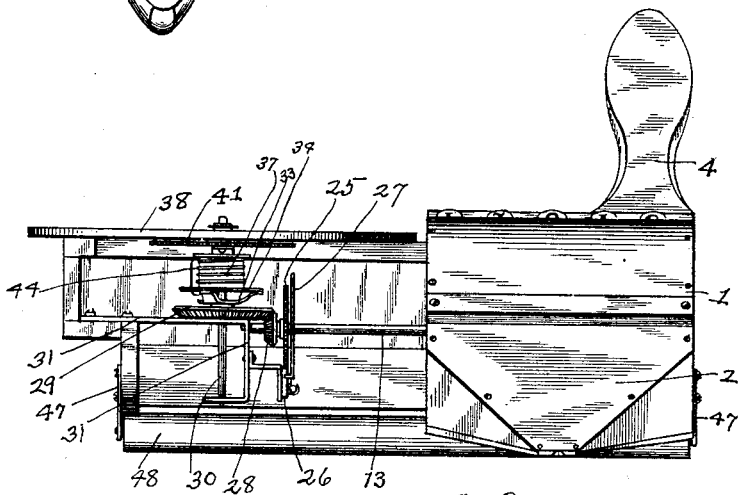

Figure 1 is a plan view of my device, showing the upper side of the casing open. Fig. 2 is a rear side view. Fig. 3 is a sectional view on line $x\,x$ of Fig. 1. Fig. 4 is a sectional view on line $y\,y$ of Fig. 1. Fig. 5 is an enlarged sectional view on line $z\,z$ of Fig. 4; and Fig. 6 is a detail view in elevation of the under side of the resetting-spool and friction-plate, which I employ in the manner hereinafter described.

Similar numerals refer to similar parts throughout the several views.

In carrying out my invention I provide a suitable casing or framework 1, the forward portion of which is in the form of a pointed nose 2, the under side of the latter being inclined upwardly, forming an obtuse angle with the main base-plate 3 of said frame. With the rear side of the base-plate 3 I form a suitable projecting handle 4.

6 represents a yoke-shaped frame, which, as shown in the drawings, is adapted to extend between the inner sides of the side walls 5, the downturned ends or arms of said yoke being fulcrumed to said side walls in the lower portion thereof, as indicated at 7. The frame 6 has secured across its rear face a bar 8, which is provided at intervals with openings 9. The yoke-frame is also provided on forward extensions thereof with a cross-arm 10, from the forward side of which depends a substantially hook-shaped pawl 11, the lower or upwardly-inclined hook end of this pawl being engaged with the teeth on the periphery of a wheel 12, said wheel being carried upon a horizontal shaft 13, which is journaled within the casing 1 and which extends outward through one of the sides 5 thereof. The pawl 11 has its lower end retained in the path of the teeth of the wheel 12 and is adapted to engage therewith by means of a spring 14, one end of which may be connected with the yoke 6 and the remaining end of which may bear against the forward side of said pawl. Through the forward end portion of the casing or main-frame body extends horizontally a shaft or rod 15, on which are fulcrumed at intervals bell-crank key-levers 16. The rearwardly-extending arms of these key-levers 16 are provided with upturned button-supporting stems 17, which, as shown in the drawings, may project upwardly through slotted openings 18, formed in the upper side of a rearward extension 19 of the casing 1, the stems 17, which, as indicated in the drawings, are of different lengths, being, as shown more clearly in Fig. 1, graduated to support the buttons 20 at different heights. Each of these buttons is provided with a number, the numbers in the present case running from "1" to "9," in which order the buttons increase in height. The forward arms of the key-levers 16 have their outer ends jointedly connected with forwardly-extending rods 21, the outer ends of the latter extending loosely through the openings 9 in the bar 8, and by being bent or suitably enlarged said forward ends of said rods are adapted to engage with the forward side of said bar 8 and are prevented from withdrawal therefrom. Each of the key-levers 16 is connected with the lower side of the main casing by coiled springs 22, which, as will readily be seen, serve to hold the numbered buttons in an elevated position.

While the yoke-frame 6 normally leans forward and is retained in this forward position through the medium of one or more springs 23, the forward movement of said frame is limited by suitable stop-shoulders 24 on the inner sides of the casing side walls.

That portion of the shaft 13 which, as shown more clearly in Fig. 2, extends through and beyond one side of the casing 1 carries on its outer end portion a toothed wheel 25, the teeth of which correspond in number to the teeth of the wheel 12. The wheel 25 has engaging with the notches formed by its pointed teeth the free end of a pawl 26, which is pressed into engagement with said wheel by means of a suitable spring 27. On the outer side of the wheel 25 the shaft 13 carries a bevel-pinion 28, the teeth of which gear with the teeth of a horizontal bevel-wheel 29, which is mounted upon a vertical shaft 30, said shaft 30 being supported in brackets 31 from a lateral frame extension 32 of the casing 1. Above the bevel-wheel 29 and secured thereto is a spring friction-plate 33, the bowed or upwardly-bent fingers of which bear against the flanged base 34 of a tube 35, which surrounds the shaft 30. This tube 35 also carries a disk 36, and between the disk 36 and tube-base 34 is carried a suitable spool or reel body 37. Surrounding the upper end of the tube 30 and secured to the framework 32 is a circular dial plate or disk 38, upon the upper face and adjacent to the margin of which are printed, engraved, or otherwise made to appear lines and figures, which in the present case run from "1" to "100," but of which there may be any suitable number or arrangement. Upon the upper end of the tube 35, which extends through a central opening in said dial-plate, is mounted an indicating-hand 39. Between the spool 37 and the under side of the dial-plate I provide the tube 35 with a pinion-wheel 40, which, as indicated more clearly in Fig. 4 of the drawings, gears with a wheel 41, which is pivoted centrally on the under side of the dial-plate. This wheel 41 has its upper surface adjacent to its outer edge divided into spaces, which are numbered, respectively, with the figures "100" and multiples thereof, as indicated at 43 in Fig. 1. These figures are adapted to show through a slotted opening 43ª in the dial-plate. Attached to the spool 37 and adapted to be wound thereon is a cord 44, which, extending outwardly from said spool, passes through an opening in the frame 32 and is adapted to wind upon a suitably-journaled reel 45, which is on the outer side of said frame and which is provided with a suitable crank-handle 46.

As indicated in the drawings, the main casing and its extended framework 32 have depending therefrom arms 47, in which are journaled the spindles or ends of a horizontal roller 48.

The nose or forward pointed end portion of the casing is, as indicated at 50, preferably provided with a forwardly-extending pointer, which is adapted to be used as hereinafter described.

The manner of operating and utilizing my device consists in depressing that button or key 20 which represents the amount to be added, and in order to illustrate this operation we will assume that the "9" key is depressed until its head is in contact with the top plate of the extension 19. This depression of said key must result, through the movement of the corresponding key-lever, in drawing the corresponding rod 21 and the yoke 6 rearward. In thus moving the yoke rearward or toward the operator the pawl 11 is moved upward and rearward, causing a corresponding rotation of the wheel 12 and its shaft 13. The rotary movement thus imparted to the shaft 13 is, through the gear connection of the wheels 28 and 29, imparted to the shaft 30. Through the frictional engagement of the spring-plate 33 with the base of the tube 35 rotary motion is communicated to said tube and to the indicator-hand 39, which is carried thereby. In a like manner rotary motion is communicated to the pinion-wheel 40, which is contributed to the gear-wheel 41. It is obvious that the degree of movement imparted to the indicator-hand in the manner above described must depend upon the degree of rotation imparted to the wheels 12 and 25, and the extent of this rotation is governed by the length of the rearward pull on the key-lever rod 21. The movement of these key-lever rods, as will readily be seen, must depend upon the degree of depression of the keys or buttons 20, and inasmuch as the supporting-stems of these keys or buttons are regulated to admit of the exact depression required for the movement of the indicator-hand over a number of dial-marks corresponding with the number which appears on said key it is obvious that the operation above described must result in the indicator-hand moving nine points or marks on the dial when the "9" key is depressed to its limit. As the pressure on the keys is released and the springs 22 are allowed to exert their influence to force said keys to their upright positions it is evident that the rods 21 will move forward and that the yoke-frame will, through the spring 23, be drawn forward and downward until its hook-pawl 11 is again engaged with a tooth on the lower side of the wheel 12. In this downward movement of the pawl the wheel 12 is prevented from backward rotation, owing to the fact that the hook end of the pawl is so inclined as to slide over the edges of the teeth of said wheel in its descent. The gear connection of the hundreds-wheel 41 with the small gear-wheel 40 is such as to move said wheel 41 a sufficient distance during one complete revolution of the indicator-hand to bring one of the hundreds-spaces 43 opposite the opening 43ª in the dial-plate. In this manner the record of the amount added on the dial-plate is transferred to the hundreds-wheel.

During the rotation of the shaft 30 it is evident that the cord 44 will be wound from the reel 45 onto the spool 37. In case it is desired to return the indicator-hand to the zero-mark it is obvious that this may be readily accomplished by turning the crank 46 and rotating the reel 45, which will result not only in winding the cord back onto the reel 46 and off of the spool, but in a rotation of the tube 35 and a consequent movement of the hand